United States Patent [19]

Shafer

[11] 4,205,902
[45] Jun. 3, 1980

[54] LASER BEAM EXPANDER

[75] Inventor: David R. Shafer, Fairfield, Conn.

[73] Assignee: The Perkin-Elmer Corporation, Norwalk, Conn.

[21] Appl. No.: 950,646

[22] Filed: Oct. 12, 1978

[51] Int. Cl.² .............................................. G02B 17/06
[52] U.S. Cl. ....................................... 350/294; 350/55
[58] Field of Search ............................ 350/55, 294, 27

[56] References Cited

U.S. PATENT DOCUMENTS

| | | | |
|---|---|---|---|
| 2,970,518 | 2/1961 | Ross | 350/55 |
| 3,674,334 | 7/1972 | Offner | 350/55 |
| 3,748,015 | 7/1973 | Offner | 350/55 |
| 3,811,749 | 5/1974 | Abel | 350/55 |

*Primary Examiner*—Jon W. Henry
*Attorney, Agent, or Firm*—Salvatore A. Giarratana; Francis L. Masselle; Edwin T. Grimes

[57] ABSTRACT

An inexpensive laser beam expander including a first mirror system comprising an off axis section of a Schwarzschild telescope system with a first, convex spherical mirror and a second, concave spherical mirror, having a first common center of curvature, the input laser beam being incident on the first mirror and reflected therefrom to the second mirror, the second mirror forming a real image at a first image point; and a second mirror system comprising a backwards Schwarzschild telescope system including a third, convex mirror and a fourth, concave mirror, having a second common center of curvature, the second system being such that parallel incident light striking the fourth concave mirror and reflected to the third convex mirror will form a virtual image behind the third convex mirror at a second image point, the second system disposed so that the second image point coincides with the first image point whereby the third convex mirror intersects the light reflected from the second concave mirror and reflects it to the fourth concave mirror, the fourth concave mirror providing a collimated output beam which is expanded.

5 Claims, 7 Drawing Figures

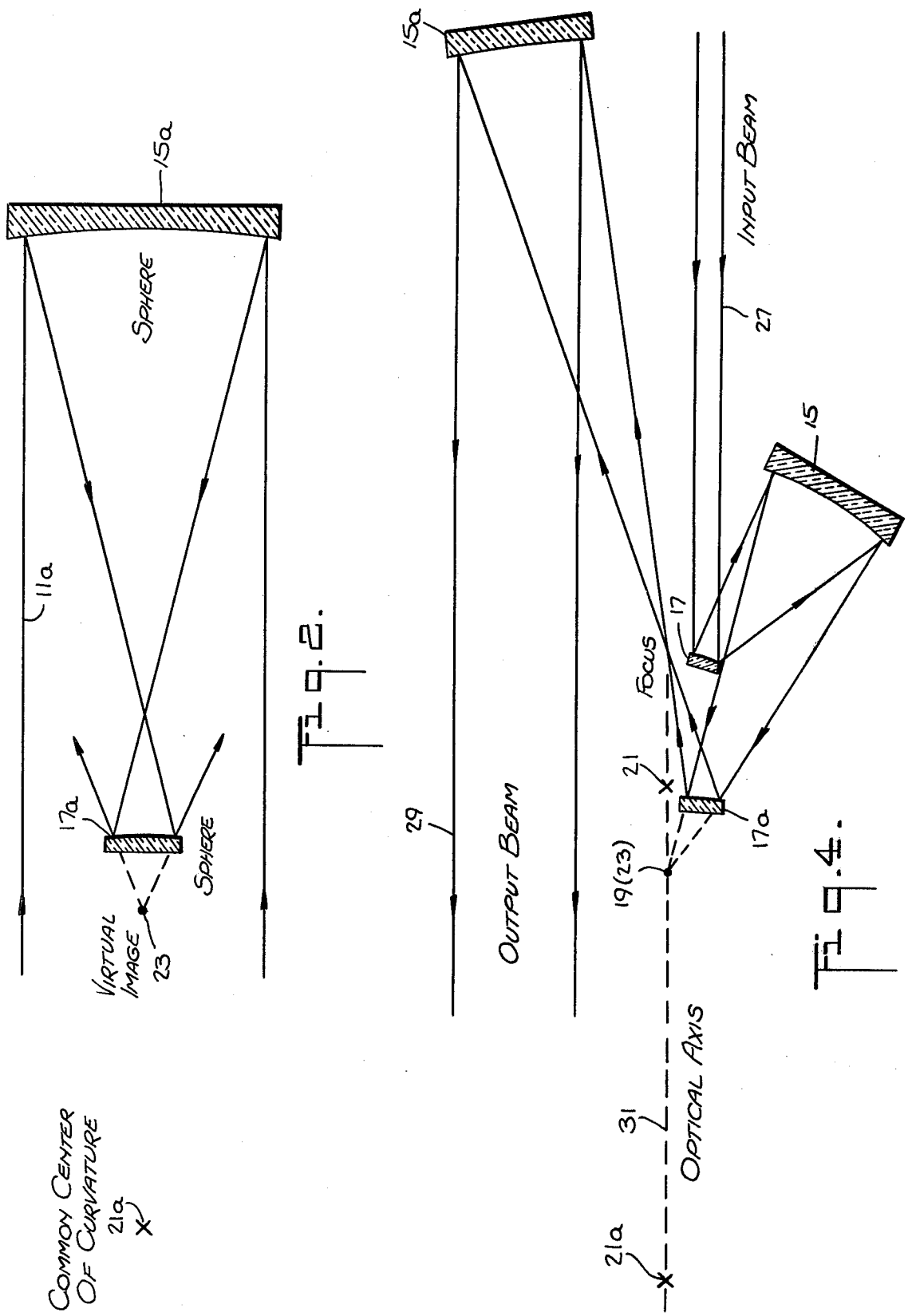

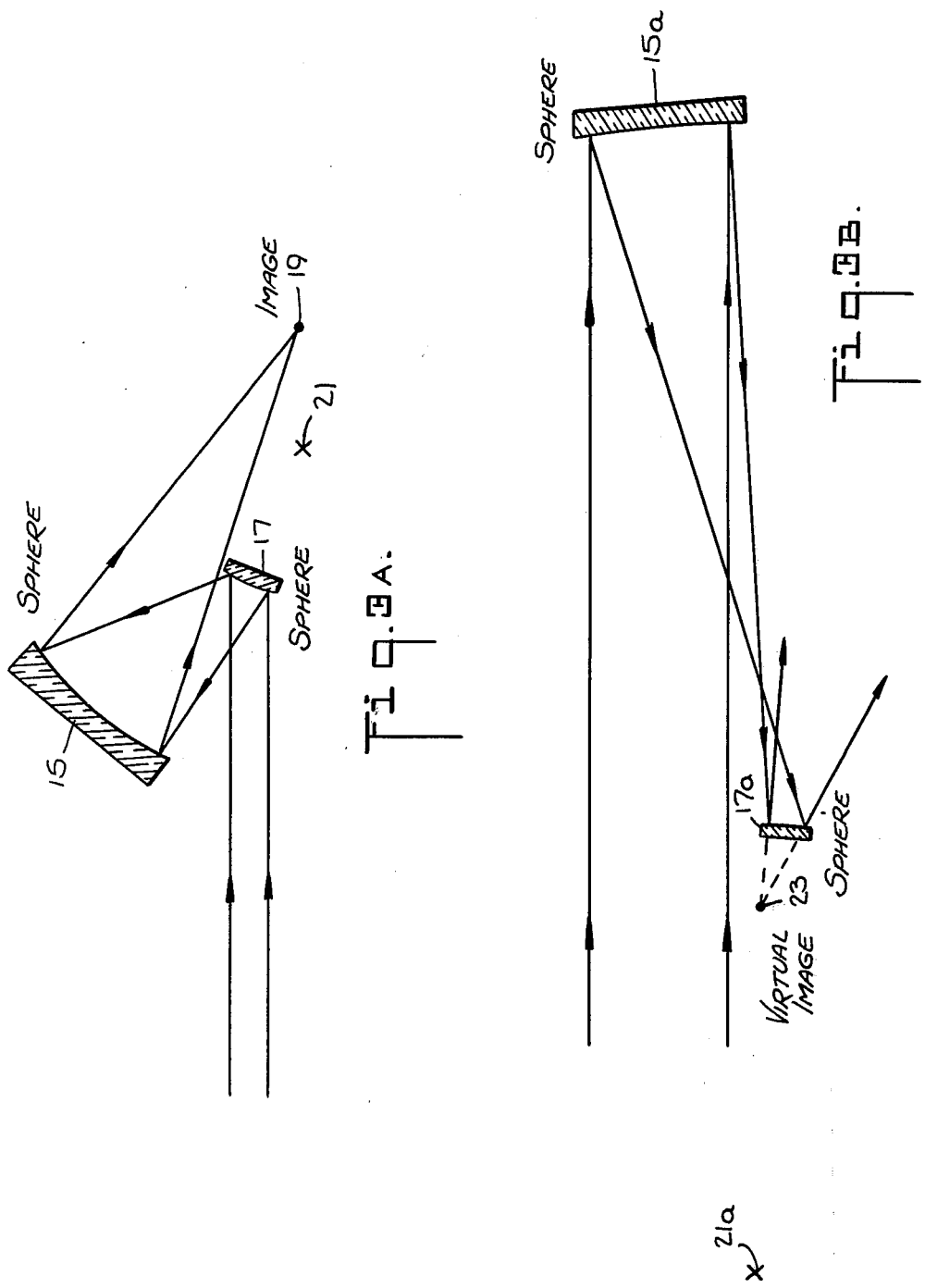

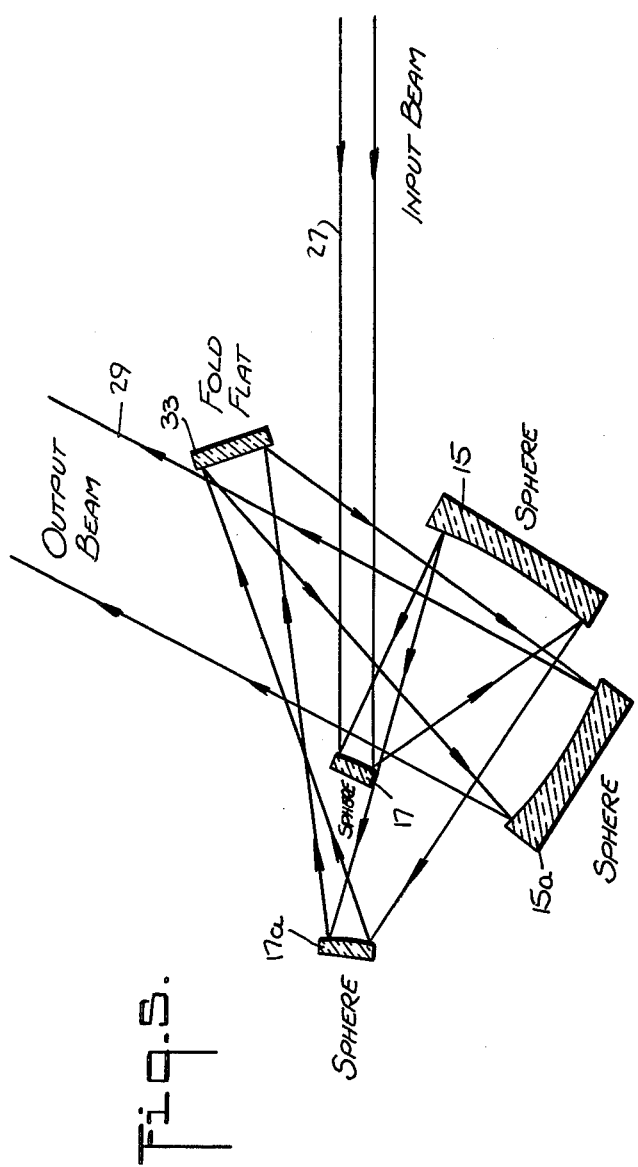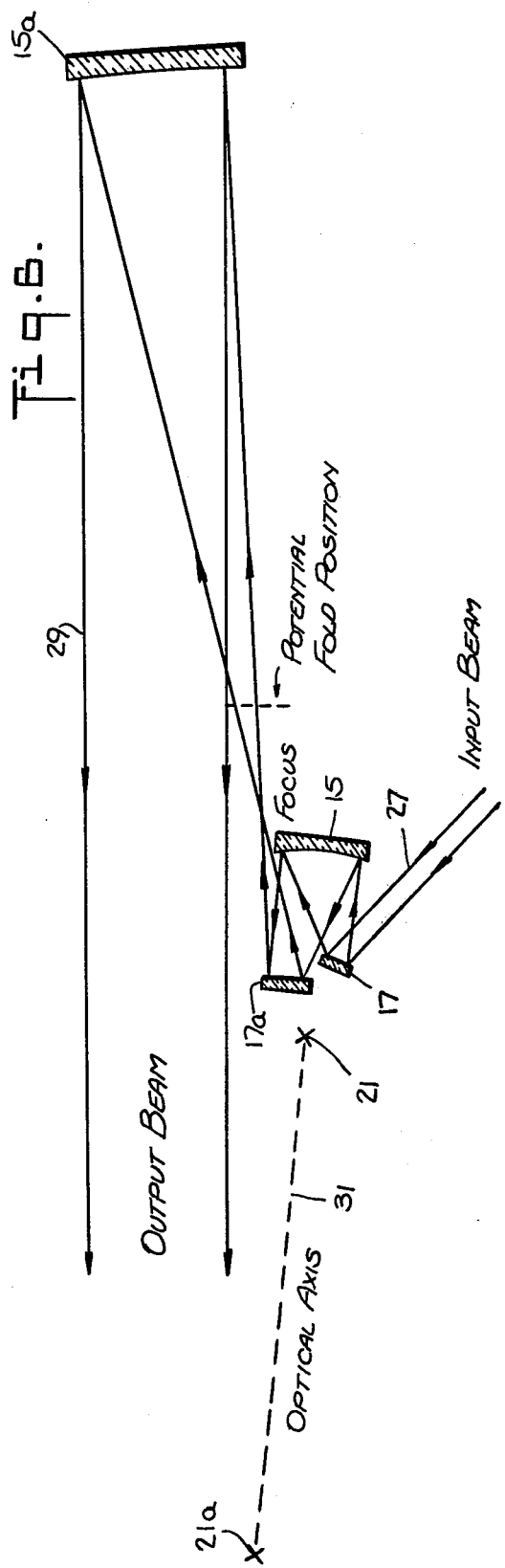

LASER BEAM EXPANDER

BACKGROUND OF THE INVENTION

This invention relates to optical systems in general and more particularly to an improved inexpensive laser beam expander.

Laser beam expanders are required for various purposes. They are used in laboratory work, for example, to expand a two millimeter beam to one inch, and are also used in connection with high powered lasers utilized in defense work. In laboratory work, it is not uncommon to use lenses to obtain the necessary expansion. The primary disadvantage of such an expander is that the lenses must be designed for certain wave lengths and cannot be used at all for infra red. Lenses cannot be used with high power lasers because of heat problems. Thus, it has been conventional when expanding high power laser beams to use cooled, confocal parabolas or some other mirror arrangement where at least one mirror is aspheric. Using aspheric mirrors causes a number of problems. Where no obscuration is allowed, off axis sections of the aspheric surfaces must be used. These become very expensive, particularly in large sizes. Furthermore, low scatter aspheric surfaces are difficult to make. Thus, scattering of light and personnel danger become a serious problem.

It can thus be seen that there is a need for an inexpensive laser beam expander which can be used at all wave lengths, both with low power and high power lasers, and which is less subject to scattering than the expanders now in use.

SUMMARY OF THE INVENTION

The present invention provides such a laser beam expander. This is accomplished through the use of two Schwarzschild telescope systems.

More specifically, in accordance with the present invention, an inexpensive laser beam expander is obtained in a four mirror system comprising a first mirror system comprising an off axis section of a Schwarzschild telescope system including a first, convex spherical mirror and a second, concave spherical mirror having a first common center of curvature, the input laser beam being incident on said first mirror and reflected therefrom to said second mirror, said second mirror forming a real image at a first image point; and a second mirror system comprising a backwards Schwarzschild telescope system including a third, convex mirror and a fourth concave mirror having a second common center of curvature, said system being such that parallel incident light striking said concave mirror and reflected to said convex mirror at a second image point, said second system disposed so that said second image point coincides with said first image point whereby said third convex mirror will intersect the light reflected from said second concave mirror and reflect it to said fourth concave mirror, said fourth concave mirror providing a collimated output beam which is expanded.

The Schwarzschild telescope, consisting of two concentric spherical mirrors, is a well known high performance design. It is corrected for spherical aberration, coma and astigmatism at the third order level. Its use as an astronomical telescope has been limited because of its considerable disadvantage of requiring one mirror that is several times the size of the entrance aperture.

Although the system has been in existence for 80 years or so, it has a remarkable feature that has almost escaped notice and has been little recognized by those skilled in the art. It turns out that the Schwarzschild design is also corrected for spherical aberration, coma, and astigmatism when used backwards. In the conventional Schwarzschild system, parallel incident light strikes a convex spherical surface from which it is reflected to a concave spherical surface which then forms the image. Used backwards, the parallel incident light first hits the concave mirror and forms a virtual image off the convex mirror. Possibly, because the well corrected image thus obtained is virtual, this feature of the system has received little attention. A particularly important feature of the Schwarzschild system is that, because it uses spherical mirrors, unobscured versions of the telescope system are no more expensive than the conventional obscured system. Since both mirrors are spherical, where sections are used, they are still spherical sections and can easily be produced.

BRIEF DESCRIPTION OF THE DRAWINGS

FIG. 2 is a similar view showing a backwards Schwarzschild telescope.

FIGS. 3a and 3b are unobstructed versions of the systems of FIGS. 1 and 2 respectively.

FIG. 4 is an optical schematic of a first embodiment of the laser beam expander of the present invention.

FIG. 5 is a similar view of a compact folding arrangement of the system of FIG. 4.

FIG. 6 is a diagram illustrating a flipped over version of the system of FIG. 4 which gives improved performance.

DETAILED DESCRIPTION OF THE INVENTION

Figure 1:
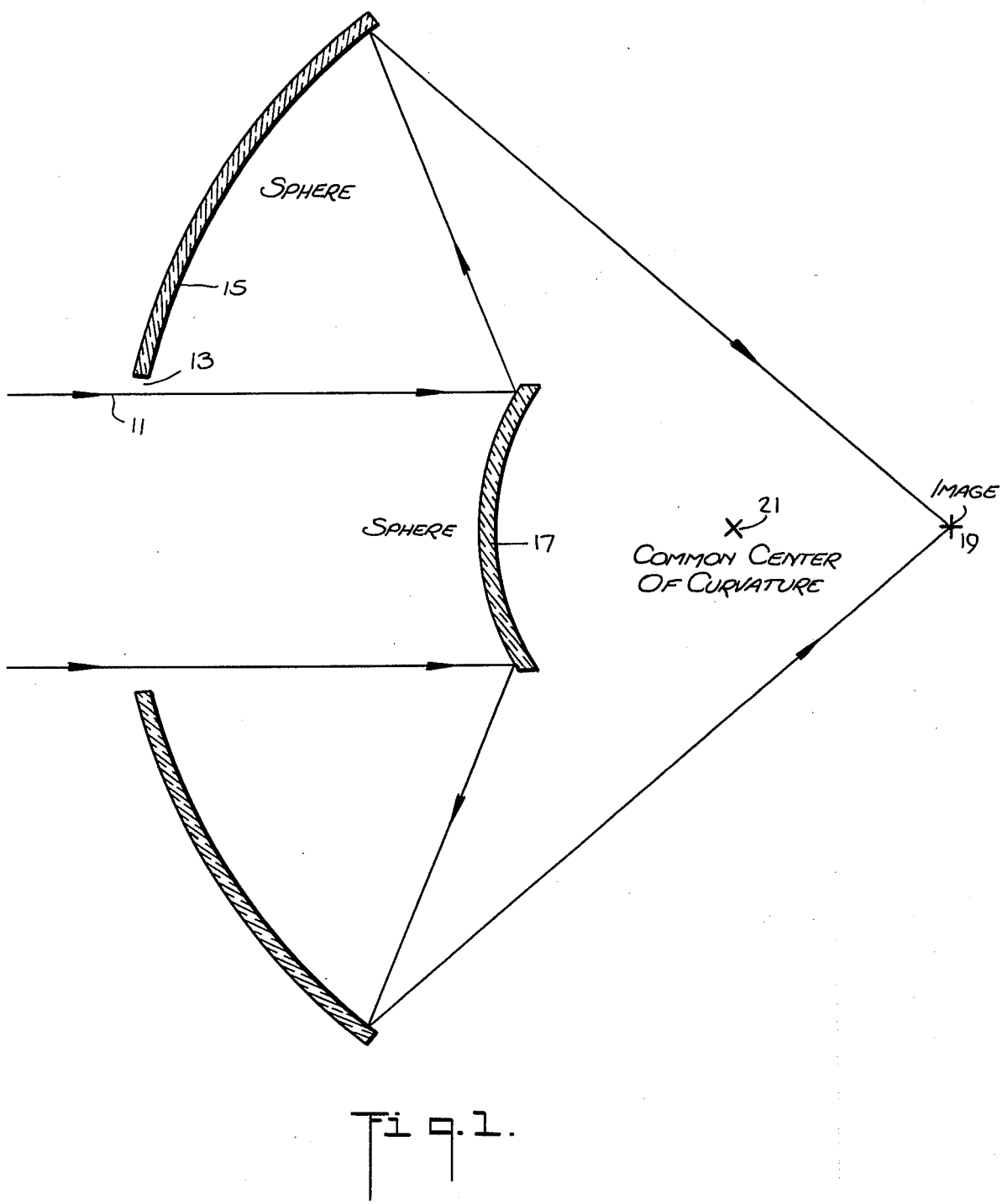
FIG. 1 is an optical schematic of a conventional Schwarzschild anastigmatic telescope using concentric spheres.

In order to obtain a better understanding of the present invention, the telescope system first developed by Schwarzschild, 80 or so years ago, will be explained with reference to FIG. 1. As illustrated, parallel rays 11 of incident light enter through an aperture 13 in a first spherical mirror 15 and strike the convex surface of a second spherical mirror 17. Light from the second spherical mirror 17 is reflected to the first spherical mirror 15 from which it is again reflected to form an image at point 19. The nature of the system is that the two mirrors 15 and 17 have a common center of curvature at point 21 and have a ratio of radii approximately equal to $(\sqrt{5}+1)/(\sqrt{5}-1)$. As noted previously, although this system is well corrected for spherical aberration, coma and astigmatism at the third order level, it has not been widely used because the size of the mirror 15 must be much larger than the entrance aperture 13.

FIG. 2 illustrates the telescope of FIG. 1 used backwards. In this arrangement, the parallel incident light rays 11a *strike the concave surface of a spherical mirror 15a* from which they are reflected to a convex spherical mirror 17a. This system does not form a real image, but forms a virtual image at point 23. Again, as noted above, because the system does only form a virtual image, it has been completely neglected in the art, even though it is as well corrected as the conventional Schwarzschild design. Again, the two spheres have a common center of curvature at point 21a.

The versions of the systems shown on FIGS. 1 and 2 are obstructed. FIGS. 3a and 3b illustrate unobstructed versions of these two systems. As is evident from a comparison of these figures with FIGS. 1 and 2, the unobstructed version is obtained by using only sections of the systems shown on FIGS. 1 and 2. However, unlike systems employing aspheric surfaces, these off axis sections are themselves spheres and are much easier to manufacture. For example, were the mirror 15 aspheric and one required a section above the entrance aperture 13, it would be necessary, for example, to construct a complete parabolic mirror and then cut out of the parabolic mirror the required section. This is expensive, requiring the manufacture of a relatively large mirror where only a portion thereof is needed. Furthermore, alignment of parabolic mirrors is more difficult than alignment of spherical mirrors.

With respect to the systems of FIG. 3, it should be noted that these systems have no optical axis as such since both of the mirrors 15 and 17 or 15a and 17b are concentric about a common point, i.e., their center of curvature.

FIG. 4 shows the manner in which the systems of FIGS. 3a and 3b are combined to form a laser beam expander. The input laser beam 27 is made incident upon the mirror 17 of the unobscured version of a conventional Schwarzschild telescope. The light is reflected to the spherical mirror 15. With nothing else, this would form an image at the point 19. However, interposed to intersect the light reflected from the mirror 15 is the mirror 17a of the backwards Schwarzschild system of FIG. 3b. It is arranged such that the virtual image 23 which it would form falls on the same point as would the real image 19a formed by mirrors 15 and 17. The second mirror 15a of this system then recollimates the light reflected from the mirror 17a to provide the expanded output beam 29. The center of curvature of the first system is at point 21 and that of the second system at point 21a. These two points define an optical axis 31 of the system. Because the two systems made up of mirrors 15 and 17 and 15a and 17a respectively are independently corrected, the two systems can be scaled up and down independently without affecting system performance. In this particular embodiment, the input and output beams are parallel to each other and to the optical axis.

As illustrated by FIG. 5, the arrangement may be made more compact through the use of a flat mirror 33 used for folding purposes. In this embodiment, the incident laser beam 27 again strikes the spherical mirror 17 and is reflected to the spherical mirror 15. The position of the spherical mirror 17a is as in FIG. 4. However, the position of the mirror 15a is changed. The flat mirror 33 is arranged so as to intersect the light reflected from the spherical mirror 17a and to reflect it to the spherical mirror 15a which is now arranged below the other mirrors. The mirror 15a is positioned so that the output beam 29 will pass between the mirrors 15 and 17. Having established this location, the flat mirror 33 is then positioned so as to not obscure the output beam 29.

FIG. 6 illustrates a further embodiment of the present invention which has been configured for better performance and gives an 8 to 1 expansion ratio. In essence, what has been done as compared to FIG. 4 is to flip over the system comprising mirrors 15 and 17. Since each half is independently corrected, this is perfectly legitimate. As in the previous embodiments, the input beam 27 is incident upon the mirror 17 from which it is reflected to the mirror 15, then to the mirror 17a, from which it is reflected to mirror 15a which forms the final output beam 29. As in the previous embodiment, the centers of curvature 21a and 21 define the optical axis 31. This embodiment can also be modified in a manner similar to that shown on FIG. 5 to insert a folding mirror to make a more compact arrangement. As is evident, with this arrangement the input and output beams are not parallel to each other or the optical axis 31.

It will be appreciated that the designs should depart slightly from the classical Schwarzschild form in order to balance high order aberrations with low order aberrations. Substantial performance improvements can be made by adjusting the optimum ratio for a particular system. However, in general, the Schwarzschild design forms a good starting point when designing a particular system. As used herein, the term Schwarzschild is meant to include such deviations.

In summary, the present invention provides a system which gives correction for spherical aberration, coma, and astigmatism with no aspheric surfaces, has no obscuration; uses no mirror larger than the output beam size; can be manufactured at low costs since it uses only spherical surfaces; has less scattering, again because of the spherical surfaces; permits a variety of possible expansion ratios; and can be used at various wave lengths including infrared.

I claim:

1. A laser beam expander comprising:
   (a) a first mirror system comprising an off axis section of a Schwarzschild telescope system including a first, convex spherical mirror and a second, concave spherical mirror, having a first common center of curvature, the input laser beam being incident on said first mirror and reflected therefrom to said second mirror, said second mirror forming a real image at a first image point; and
   (b) a second mirror system comprising a backwards Schwarzschild telescope system including a third, convex mirror and a fourth, concave mirror having a second common center of curvature, said system being such that parallel incident light striking said concave mirror and reflected to said convex mirror will form a virtual image behind said convex mirror at a second image point, said second system disposed so that said second image point coincides with said first image point whereby said third convex mirror will intersect the light reflected from said second concave mirror and reflect it to said fourth concave mirror, said fourth concave mirror providing a collimated output beam which is expanded.

2. The laser beam expander of claim 1 wherein said input beam and output beam are parallel to each other and to an optical axis formed by a line drawn through the common centers of curvature of said first and second systems.

3. The laser beam expander of claim 1 wherein the input laser beam and output beam are at an angle to each other and to an optical axis formed by a line drawn between the centers of curvature of said first and second systems.

4. The laser beam expander of claim 1 and further including a flat mirror for folding purposes and wherein said fourth concave mirror is disposed in a position below said first, second and third mirrors, said flat mirror arranged so as to intersect light reflected from said third mirror to direct it to said fourth mirror, said fourth mirror and flat mirror being arranged so as to avoid obstruction of the output beam by any of the mirrors in the system.

5. A laser beam expander comprising:
(a) a first, convex spherical mirror of a size at least equal to that of a laser beam to expanded;
(b) a second concave spherical mirror of a size at least equal to the desired final expanded size of an output beam;
(c) a third, concave spherical mirror; and
(d) a fourth, convex spherical mirror, said first and third mirrors arranged to have a common center of curvature and to form a first Schwarzschild telescope system forming a real image, the second and fourth spherical mirrors having a second common center of curvature and forming a second Schwarzschild type telescope having a virtual image, said two systems disposed so that said real image and virtual image are coincident.

* * * * *